(12) United States Patent
Ortmann et al.

(10) Patent No.: US 11,623,627 B2
(45) Date of Patent: Apr. 11, 2023

(54) ENGINE START CONTROL SYSTEM FOR A HYBRID VEHICLE

(71) Applicant: FORD GLOBAL TECHNOLOGIES, LLC, Dearborn, MI (US)

(72) Inventors: Walter Joseph Ortmann, Saline, MI (US); Naginder Gogna, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/096,284

(22) Filed: Nov. 12, 2020

(65) Prior Publication Data
US 2022/0144241 A1 May 12, 2022

(51) Int. Cl.
| | | |
|---|---|---|
| *B60W 10/00* | (2006.01) | |
| *B60W 10/06* | (2006.01) | |
| *B60W 10/08* | (2006.01) | |
| *F02D 28/00* | (2006.01) | |

(52) U.S. Cl.
CPC ............ *B60W 10/06* (2013.01); *B60W 10/08* (2013.01); *F02D 28/00* (2013.01); *B60W 2552/15* (2020.02); *B60W 2552/30* (2020.02); *B60W 2555/20* (2020.02); *B60W 2555/60* (2020.02); *F02D 2200/702* (2013.01)

(58) Field of Classification Search
CPC ............ B60W 10/06; B60W 2552/15; B60W 2552/30; B60W 2555/20; B60W 2555/60; F02D 28/00; F02D 2200/702
See application file for complete search history.

(56) References Cited

U.S. PATENT DOCUMENTS

| | | |
|---|---|---|
| 6,543,565 B1 | 4/2003 | Phillips et al. |
| 7,021,409 B2 | 4/2006 | Tamor |
| 7,143,851 B2 | 12/2006 | Masterson |
| 8,831,809 B2 | 9/2014 | Wang et al. |
| 9,067,595 B2 | 6/2015 | Wright et al. |
| 9,227,622 B2 | 1/2016 | Wright et al. |
| 9,254,840 B2 | 2/2016 | Kim et al. |
| 9,283,955 B2 | 3/2016 | Nedorezov et al. |

(Continued)

FOREIGN PATENT DOCUMENTS

| | | |
|---|---|---|
| EP | 3257714 A1 | 12/2017 |
| JP | 2010188948 A | 9/2010 |

(Continued)

*Primary Examiner* — Phutthiwat Wongwian
*Assistant Examiner* — Sherman D Manley
(74) *Attorney, Agent, or Firm* — David B. Kelley; Brooks Kushman P.C.

(57) ABSTRACT

A vehicle includes a powertrain and a controller. The powertrain has an engine and an electric machine that are each configured to generate power within the powertrain to propel the vehicle. The controller is programmed to, generate a powertrain power output profile required to propel the vehicle over a predetermined route based on navigation data. The controller is further programmed to, in response to the electric machine operating to propel the vehicle over the predetermined route while the engine is shutdown and an upcoming increase in the powertrain power output profile to a value that is greater than a threshold, initiate an engine start at a predetermined time period before the upcoming increase in the powertrain power output profile.

17 Claims, 4 Drawing Sheets

(56) References Cited

U.S. PATENT DOCUMENTS

| | | |
|---|---|---|
| 9,415,773 B2 | 8/2016 | Johri et al. |
| 9,592,823 B2 | 3/2017 | Nakanishi et al. |
| 9,597,979 B1* | 3/2017 | Hao .................. B60K 6/387 |
| 9,604,635 B1 | 3/2017 | Johri et al. |
| 9,731,706 B2 | 8/2017 | Nefcy et al. |
| 9,792,736 B1* | 10/2017 | Koebler ................. G07C 5/008 |
| 9,846,049 B2* | 12/2017 | Krumm ............. G01C 21/3484 |
| 9,896,085 B2* | 2/2018 | Morisaki ............. B60W 20/12 |
| 9,926,902 B2 | 3/2018 | Crisp et al. |
| 9,932,914 B2 | 4/2018 | Mansour et al. |
| 9,969,383 B2 | 5/2018 | Gibson et al. |
| 10,023,179 B2 | 7/2018 | Shakiba-Herfeh et al. |
| 10,518,767 B2 | 12/2019 | Ruybal et al. |
| 10,584,976 B2* | 3/2020 | Kim .................... G08G 1/0112 |
| 10,829,104 B2* | 11/2020 | Lavertu ............. B60W 50/0097 |
| 10,882,399 B2* | 1/2021 | Koebler .................. B60L 50/62 |
| 11,084,377 B2* | 8/2021 | Koebler .................. B60L 50/62 |
| 11,117,566 B2* | 9/2021 | Pursifull ............. B60W 30/182 |
| 2005/0051371 A1 | 3/2005 | Masterson |
| 2005/0211479 A1 | 9/2005 | Tamor |
| 2005/0228553 A1* | 10/2005 | Tryon .................... B60L 50/16 701/22 |
| 2008/0224478 A1 | 9/2008 | Tamor |
| 2012/0179357 A1* | 7/2012 | Phillips .................. F02D 17/02 701/112 |
| 2014/0052361 A1* | 2/2014 | Blumenstock ........ F02D 41/263 701/102 |
| 2015/0105949 A1 | 4/2015 | Wright et al. |
| 2015/0197243 A1 | 7/2015 | Johri et al. |
| 2016/0096522 A1* | 4/2016 | Ortmann ................ B60K 6/387 475/5 |
| 2016/0129918 A1* | 5/2016 | Skaff .................... B60W 50/14 340/455 |
| 2016/0236674 A1 | 8/2016 | Mori et al. |
| 2017/0080923 A1 | 3/2017 | Johri et al. |
| 2017/0282744 A1* | 10/2017 | Koo ..................... B60L 53/305 |
| 2017/0305408 A1 | 10/2017 | Nefcy et al. |
| 2018/0229712 A1 | 8/2018 | Shelton et al. |
| 2018/0244262 A1 | 8/2018 | Ruybal et al. |
| 2018/0362017 A1* | 12/2018 | Meyer ...................... B60K 6/26 |
| 2019/0107069 A1 | 4/2019 | Zhao et al. |
| 2019/0168743 A1 | 6/2019 | Friedrich et al. |
| 2019/0322279 A1 | 10/2019 | Awadi et al. |
| 2020/0191069 A1* | 6/2020 | Naidu ................... B60W 40/10 |

FOREIGN PATENT DOCUMENTS

| | | |
|---|---|---|
| JP | 2019093811 A | 6/2019 |
| WO | 2009112105 A2 | 9/2009 |

* cited by examiner

ENGINE START CONTROL SYSTEM FOR A HYBRID VEHICLE

TECHNICAL FIELD

The present disclosure relates to hybrid vehicles and control systems for hybrid vehicles.

BACKGROUND

Hybrid vehicles may include multiple power sources that are configured to propel the vehicle.

SUMMARY

A vehicle includes a powertrain, a drive horizon system, and a controller. The drive horizon system is configured to generate a powertrain power output profile required to propel the vehicle over a predetermined route based on navigation data. The navigation data includes a road grade of the predetermined route, a speed limit of the predetermined route, a road curvature of the predetermined route, traffic conditions of the predetermined route, or weather conditions of the predetermined route. The controller is programed to, in response to the electric machine operating to propel the vehicle over the predetermined route while the engine is shutdown and an upcoming increase in the powertrain power output profile to a value that is greater than a threshold, initiate an engine start at a predetermined time period before the upcoming increase in the powertrain power output profile. The controller is further programmed to, in response to the electric machine operating to propel the vehicle over the predetermined route while the engine is shutdown and an upcoming increase in the powertrain power output profile to a value that is less than the threshold, maintain operating the electric machine to propel the vehicle over the predetermined route with the engine being shutdown.

A vehicle includes a powertrain and a controller. The powertrain has an engine and an electric machine. The controller is programmed to, generate powertrain power output values to propel the vehicle at specified locations along a predetermined route based on navigation data. The controller is further programmed to, in response to the electric machine operating to propel the vehicle over the predetermined route while the engine is shutdown and an upcoming increase in the values that is greater than a threshold, initiate an engine start at a predetermined time period before the upcoming increase in the values.

A vehicle includes an engine, an electric machine, and a controller. The controller is programmed to, generate a power output profile required to propel the vehicle over a predetermined route based on navigation data. The controller is further programmed to, in response to the electric machine operating to propel the vehicle over the predetermined route while the engine is shutdown and an upcoming increase in the power output profile to a value that is greater than a threshold, initiate an engine start at a predetermined time period before the upcoming increase in the power output profile. The controller is further programmed to, in response to the electric machine operating to propel the vehicle over the predetermined route while the engine is shutdown and an upcoming increase in the power output profile to a value that is less than the threshold, maintain operating the electric machine to propel the vehicle over the predetermined route with the engine being shutdown.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
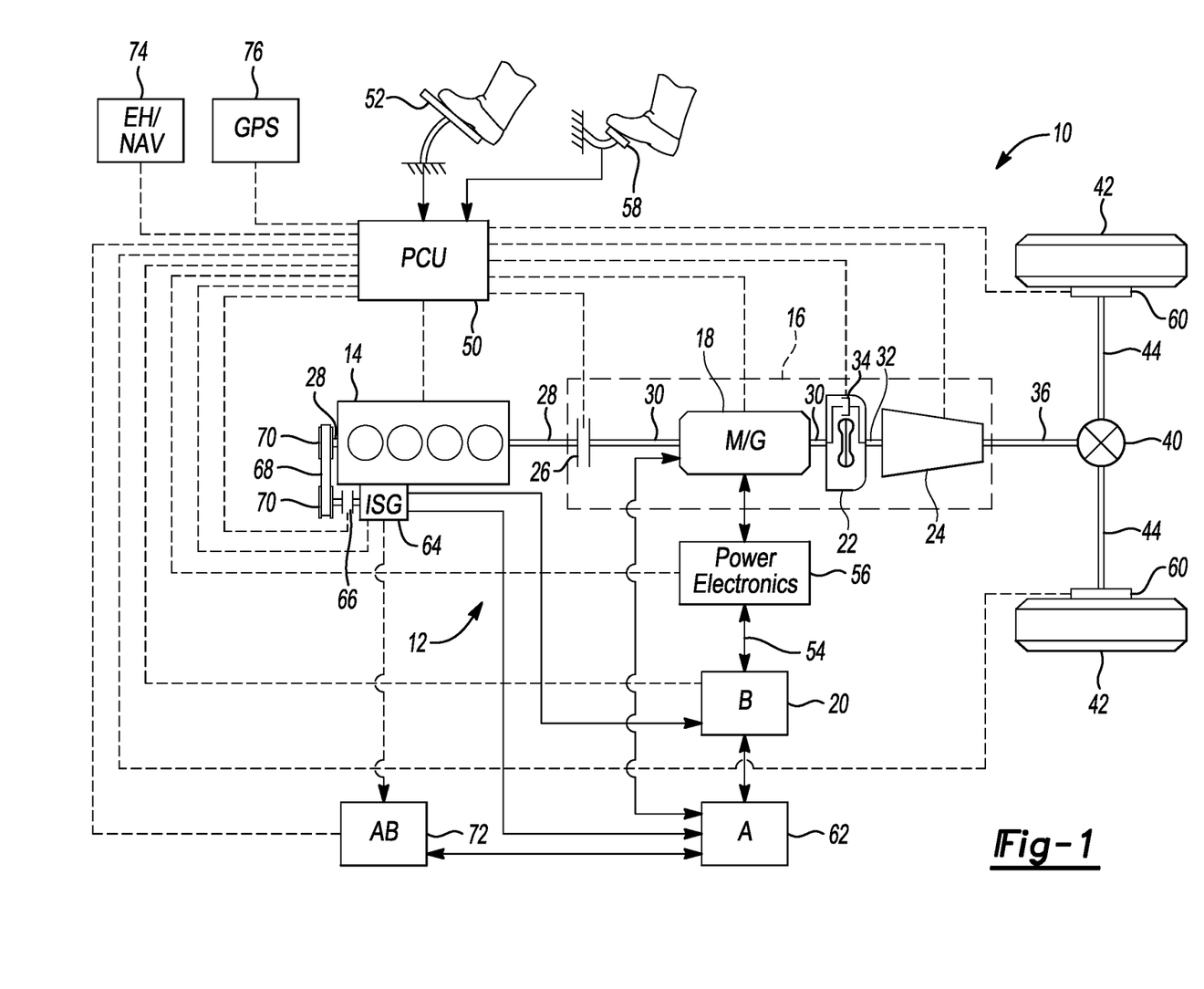
FIG. 1 is a schematic illustration of a representative powertrain of a hybrid electric vehicle.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the HEV 10 that are configured to propel the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The MIG 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch (also known as a torque converter lock-up clutch) 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). Power and torque from both the engine 14 and the M/G 18 may be delivered to and received by gearbox 24. The gearbox 24 then provides powertrain output power and torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, battery 20, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic and/or algorithms executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging or discharging (including determining the maximum charge and discharge power limits), regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), battery temperature, voltage, current, or state of charge (SOC) for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the accelerator pedal 52 generates an accelerator pedal position signal that may be interpreted by the controller 50 as a demand for increased power or decreased power, respectively. A brake pedal 58 is also used by the driver of the vehicle to provide a demanded braking torque to slow the vehicle. In general, depressing and releasing the brake pedal 58 generates a brake pedal position signal that may be interpreted by the controller 50 as a demand to decrease the vehicle speed. Based upon inputs from the accelerator pedal 52 and brake pedal 58, the controller 50 commands the torque to the engine 14, M/G 18, and friction brakes 60. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative torque to the shaft 30. This operation mode may be referred to as an "electric only" or "EV" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which torque and rotational (or motive) energy or power from spinning wheels 42 is transferred back through the gearbox 24, torque converter 22, (and/or torque converter bypass clutch 34) and is converted into electrical energy for storage in the battery 20.

The battery 20 and the M/G 18 may also be configured to provide electrical power to one or more vehicle accessories 62. The vehicle accessories 62 may include, but are not limited to, air conditioning systems, power steering systems, electric heaters, or any other system or device that is electrically operated.

An integrated starter-generator (ISG) 64 may be coupled to the engine 14 (i.e., may be coupled to the crankshaft 28 of the engine 14). The ISG 64 may be configured to operate as a motor to start the engine 14 during an engine start-up event, or to provide additional torque to the powertrain 12 during vehicle operations. The ISG 64 may also be configured to receiving torque from the engine 14 and operate as a generator. The ISG 64 may be selectively coupled to the engine by a clutch 66, belt 68, and a pair of pulleys 70. If the ISG 64 is coupled to the engine by a belt 68 it may be referred to as a belt integrated starter-generator (BISG). The controller 50 may be configured to transmit signals to the ISG 64 to operate the ISG 64 as either a motor or a generator. The controller may also be configured to transmit signals to the clutch 66 in order to open or close the clutch 66. The ISG 64 will be coupled to the engine 14 when the clutch is in a closed state and decoupled from the engine 14 when the clutch 66 is in an open state. The ISG 64 may be configured to provide electrical energy to charge an accessory battery 72, the traction battery 20, or provide electrical energy to power the vehicle accessories 62 when operating as a generator. The accessory battery 72 may also be configured to power the vehicle accessories 62.

The controller 50 may be configured to receive various states or conditions of the various vehicle components illustrated in FIG. 1 via electrical signals. The electrical signals may be delivered to the controller 50 from the various components via input channels. Additionally, the electrical signals received from the various components may be indicative of a request or a command to change or alter a state of one or more of the respective components of the vehicle 10. The controller 50 includes output channels that are configured to deliver requests or commands (via electrical signals) to the various vehicle components. The controller 50 includes control logic and/or algorithms that are configured to generate the requests or commands delivered through the output channels based on the requests, commands, conditions, or states of the various vehicle components.

The input channels and output channels are illustrated as dotted lines in FIG. 1. It should be understood that a single dotted line may be representative of both an input channel and an output channel into or out of a single element. Furthermore, an output channel into one element may operate as an input channel to another element and vice versa.

The vehicle 10 may include an electronic horizon and/or navigation module 74. The electronic horizon and/or navigation module 74 may be a part of controller 50 or may be a separate controller that communicates with controller 50. The electronic horizon and/or navigation module 74 may include onboard navigation data or information such as map data and route attribute data. The position of the vehicle relative to the map data within electronic horizon and/or navigation module 74 may be determined via a global positing system (GPS) 76. The GPS 76 may be a part of controller 50 or may be a separate module that communicates with controller 50. AV2HP/Electronic Horizon software (i.e., the software of the electronic horizon and/or navigation module 74) communicates static route attributes to the controller 50, in the direction the vehicle 10 is traveling based on a predetermined or calibratable horizon length (i.e., a predetermined distance in front of the vehicle 10 on the current route the vehicle is traveling on). The electronic horizon and/or navigation module 74 and the GPS 76 may each include a microprocessor, memory storage, and/or any other attribute described with respect to controller 50 herein.

The navigation data within the electronic horizon and/or navigation module 74 that includes the route attribute data may include data or information regarding the region in which the vehicle is operating, such as road grade, speed limit, road curvature, posted signs (e.g., stop signs, yield signs, etc.), number of lanes, etc. The data or information regarding the region in which the vehicle is operating is static data or information (i.e., information that does change with time). Additionally, the navigation data may include dynamic data or information such as traffic data or information (e.g., traffic volume or traffic density) and weather data or information (e.g., temperature, humidity, rain, snow, or any factor that may affect traffic speed, road pavement conditions, etc.).

Such static data or information and/or dynamic data or information may be stored in the controller 50, the electronic horizon and/or navigation module 74, or GPS 76. Such static data or information and/or dynamic data or information may be received via vehicle-to-vehicle (V2V) communication (i.e., data transmitted and received from other vehicles), vehicle-to-infrastructure (V2I) communication (i.e., data transmitted and received from the roadway infrastructure), vehicle-to-everything (V2X) communication (i.e., data transmitted and received from any source), virtual-to-physical (V2P) data, (i.e., data that is based on a virtual model), radio transmissions (e.g., AM, FM, or Satellite digital audio radio service), vehicle sensors (e.g., radar, lidar, sonar, cameras, etc.), a traffic information server, etc. The vehicle 10 sensors may be configured to communicate with the controller 50 and maybe utilized to detect conditions proximate the vehicle 10 such as traffic volume, weather conditions (e.g., rain or snow), etc. The vehicle may include a receiver that is configured to communicate wirelessly received data (e.g., V2V, V2I, V2X, etc. data) to the controller 50.

A drive horizon program, which may be stored within controller 50 or may be separate controller that communicates with controller 50, may superimpose the dynamic data or information (e.g., traffic or weather data) over the static data or information (e.g., map data and route attribute data) to predict vehicle events such as, acceleration, deceleration, coasting, etc., in the horizon (i.e., the predetermined distance in front of the vehicle 10 on the current route the vehicle is traveling on) along the route. Such predictions of vehicle events such as, acceleration, deceleration, coasting, etc., allows further predictions of vehicle speed, load from the road grade, thermal loads on the vehicle 10 (or vehicle subcomponents), friction coefficient of the road surface (which may be affected by weather or conditions such as flooding or road spills), and other attributes (e.g., presence of stop signs, traffic lights, change in speed limits, climate demand, Road curvature, speed and acceleration of other vehicles, construction, etc.) that could be used to predict the expected power and energy needed from the powertrain to propel the vehicle. By knowing the predicted power and torque needed to propel the vehicle 10, the decision to start the engine may be changed dynamically to optimize fuel consumption and improve drivability.

It should be understood that the schematic illustrated in FIG. 1 is merely representative and is not intended to be limiting. Other configurations are contemplated that utilize selective engagement of both an engine and a motor to transmit power through the transmission. For example, the M/G 18 may be offset from the crankshaft 28, and/or the M/G 18 may be provided between the torque converter 22 and the gearbox 24. Other configurations are contemplated without deviating from the scope of the present disclosure.

It should be understood that the vehicle configuration described herein is merely exemplary and is not intended to be limited. Other hybrid vehicle configurations should be construed as disclosed herein. Other vehicle configurations may include, but are not limited to, micro-hybrid vehicles (i.e., powered by an engine only that has a start/stop function), series hybrid vehicles, parallel hybrid vehicles, series-parallel hybrid vehicles, plug-in hybrid electric vehicles (PHEVs), or any other hybrid vehicle configuration known to a person of ordinary skill in the art.

Figure 2:
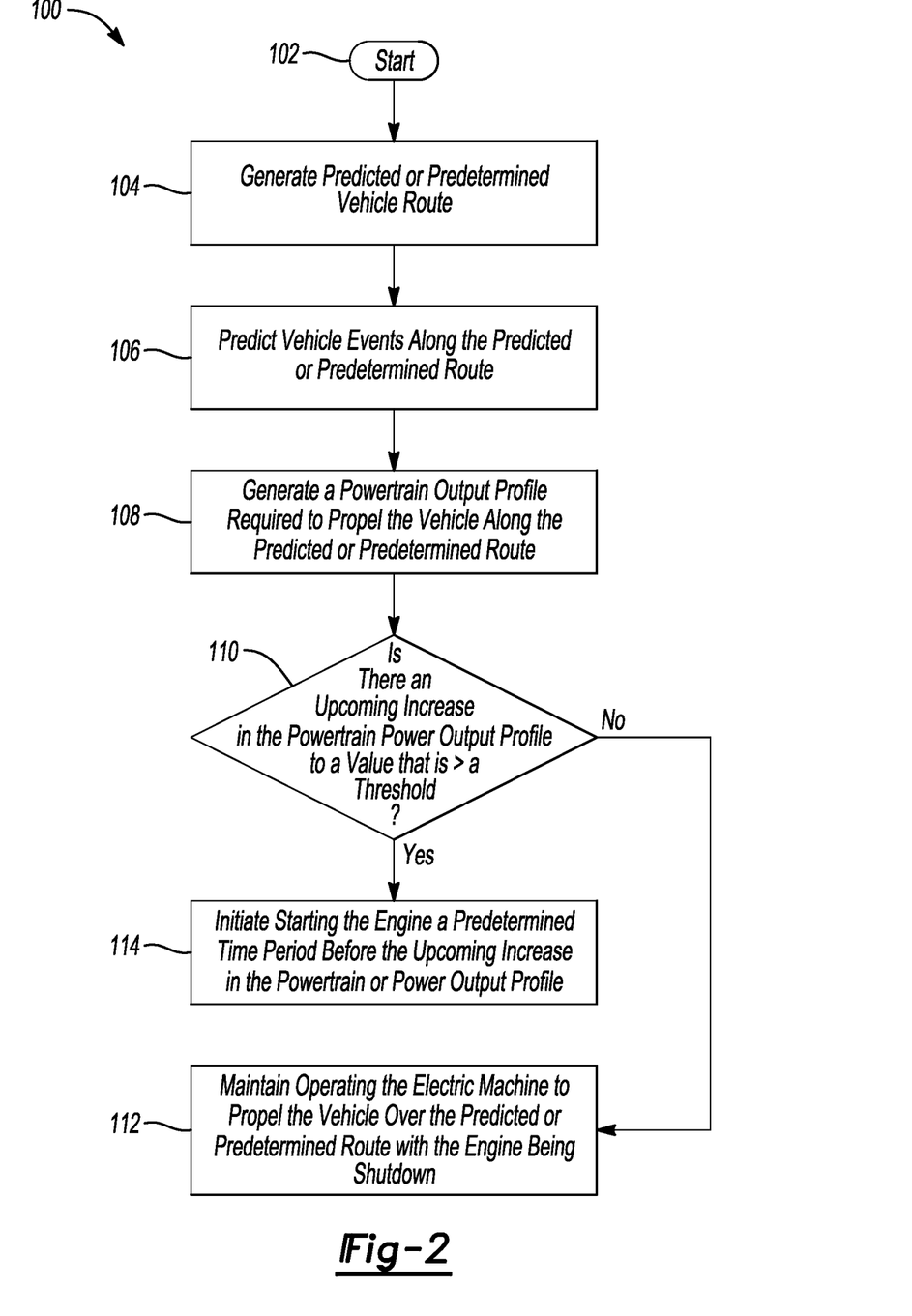
FIG. 2 is a flowchart illustrating a method for controlling engine starts based on the powertrain power output profile.

Referring to FIG. 2, a flowchart of a method 100 for controlling engine starts based on a powertrain power output profile is illustrated, respectively. The method 100 may be stored as control logic and/or an algorithm within the controller 50. The controller 50 may implement the method 100 by controlling the various components of the vehicle 10. The method 100 is initiated at start block 102. The method 100 may be initiated at start block 102 by turning a start key or ignition of the vehicle 10 to an "on" position.

The method 100 then moves on to block 104 where a predicted or predetermined route of the vehicle 10 may be generated. For example, the predicted or predetermined route of the vehicle 10 may be based on a current location of the vehicle 10 according to the GPS 76 and may be based on a predetermined distance in front of the vehicle 10 on the current route the vehicle is traveling on (i.e., the electronic horizon), which is generated by the electronic horizon and/or navigation module 74. Alternatively, the predicted or predetermined route of the vehicle 10 may be based on the location according the to the GPS 76 and a route that is generated by the electronic horizon and/or navigation module 74 in response to an operator inputting a desired destination into the electronic horizon and/or navigation module 74 via a human machine interface (HMI).

Next, the method 100 moves on to block 106 where vehicle events (e.g., acceleration, deceleration, coasting, etc.) are predicted along the predicted or predetermined route based on navigation data, such as the static data or information (e.g., road grade, speed limit, road curvature, posted signs, such as stop signs, yield signs, etc., number of lanes, etc.) and/or the dynamic data or information (e.g., traffic volume, traffic density, weather conditions, etc.) described herein. The data from the predicted vehicle events in block 106 is then utilized to predict vehicle speed, load from the road grade, thermal loads on the vehicle 10, friction coefficient of the road surface, and other attributes (e.g., presence of stop signs, traffic lights, change in speed limits, climate demand, Road curvature, speed and acceleration of other vehicles, construction, etc.), which are then used to predict the expected torque, power, and/or energy needed from the powertrain (or more specifically the expected torque, power, and/or energy output of the engine 14 and or M/G 18) to propel the vehicle along the predicted or predetermined route. The expected torque, power, and/or energy needed from the powertrain to propel the vehicle along the predicted or predetermined route may then be utilized to generate a powertrain power output profile required to propel the vehicle over the predicted or predetermined route at block 108. The powertrain power output profile may be a graph that corresponds the expected power output of the powertrain 12 to specified locations or positions along the predicted or predetermined route. Such a powertrain power output profile may be generated and/or stored within the controller 50 or the electronic horizon and/or navigation module 74.

The method 100 then moves on to block 110 where it is determined if there is an upcoming increase in the powertrain power output profile to a value that is greater than a threshold while the M/G 18 is propelling the vehicle 10 over the predicted or predetermined route while the engine 14 is shutdown. The threshold may be referred to an engine pull-up threshold. The threshold may correspond to a value where it is desirable to start the engine 14 because the power limits of the M/G 18, the power limits of the battery 20, and/or the state of charge of the battery 20, may not be sufficient such that the M/G 18 is able to continue propelling the vehicle alone or may only be sufficient such that the M/G 18 is able to continue propelling the vehicle alone for a limited time.

If the answer at block 110 is "NO," the method 100 moves on to block 112, where the current operation is maintained and the M/G 18 continues to propel the vehicle 10 over the predicted or predetermined route while the engine 14 is shutdown. If the answer at block 110 is "YES," the method 100 moves on to block 114, where an engine start is initiated a predetermined time period before the upcoming increase in the powertrain output profile to greater than the threshold. Initiating the engine start may be accomplished by operating a starter motor (e.g., ISG 64) to initiate the engine start at the predetermined time period before the upcoming increase in the powertrain power output profile to the value that is greater than the threshold. Alternatively, initiating the engine start may be accomplished by increasing a pressure on the disconnect clutch 26 to initiate the engine start at the predetermined period of time before the upcoming increase in the powertrain power output profile to the value that is greater than the threshold. Increasing the pressure on the disconnect clutch 26 may more specifically refer to increasing a hydraulic pressure on an actuator, such as a piston, that engages the disconnect clutch 26.

It should be understood that the flowchart in FIG. 2 is for illustrative purposes only and that the method 100 should not be construed as limited to the flowchart in FIG. 2. Some of the steps of the method 100 may be rearranged while others may be omitted entirely.

Figure 3:
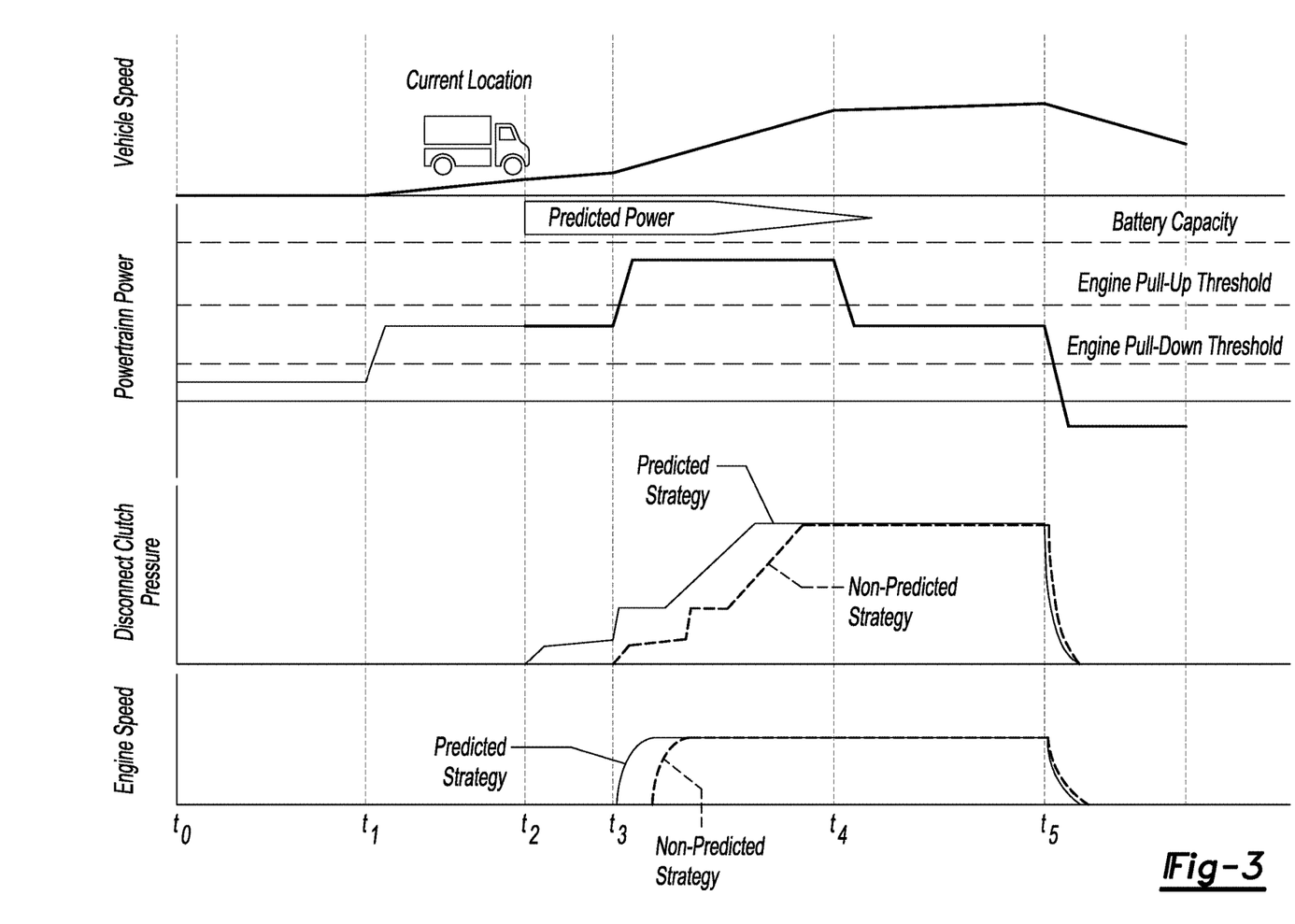
FIG. 3 is a series of graphs illustrating various vehicle parameters during an engine start that is initiated by closing an engine disconnect clutch.

Referring to FIG. 3, a series of graphs of various vehicle parameters during an engine start that is initiated by closing the engine disconnect clutch 26 is illustrated. The power graph illustrated in FIG. 3 corresponds to the powertrain power output profile required to propel the vehicle over the predicted or predetermined route determined at block 108 in method 100. At time $t_0$ the vehicle 10 is stopped and the powertrain 12 is producing minimal power. At time $t_1$, the vehicle 10 begins to slowly accelerate. The powertrain power output profile remains below the engine start or pull-up threshold between times $t_1$ and $t_2$. Therefore, between times $t_1$ and $t_2$, the powertrain 12 remains in the EV mode (i.e., the M/G 18 continues to propel the vehicle 10 while the engine 14 remains shutdown).

At time $t_2$, however, based on the predicted power outputs of the powertrain 12 according to the powertrain power output profile, the powertrain strategy determines that the engine 14 is expected to start in a short period of time (e.g., the predetermined period of time) in response to an upcoming increase in the powertrain power output profile to greater than the engine start or pull-up threshold. The powertrain strategy initiates the engine start at time $t_2$ by increasing the pressure on the disconnect clutch 26 between times $t_2$ and $t_3$, such that the disconnect clutch 26 begins cranking the engine at time $t_3$. At time $t_3$, the powertrain power output profile is increased to increase vehicle acceleration and the engine start is requested at the predetermined time period before time $t_3$ (i.e., at time $t_2$). Since the disconnect clutch 26 pressure was increased between times $t_2$ and $t_3$ in anticipation of the engine start, the disconnect clutch 26 is ready and only a small amount of additional pressure and torque (torque stroke) is required for the disconnect clutch 26 to immediately begin cranking the engine 14 in order to start the engine 14. In the case of a non-predicted strategy that does not predict the powertrain power requirements according the powertrain power output profile, there is an added delay in stroking the disconnect clutch 26 and bringing the engine 14 up to the desired speed relative to the predicted strategy that is based on the powertrain power output profile. Such a delay is illustrated in FIG. 3 by the timing differences between the non-predicted strategy and the predicted strategy according to the powertrain power output profile. At time $t_4$, the driver demand is decreased but the power demand of the powertrain power output profile remains high enough to keep the engine 14 on. At time $t_5$, the vehicle 10 begins to slow down and the power demand decreases to less than an engine pull-down or shutdown threshold, where the engine 14 is shut down.

Figure 4:
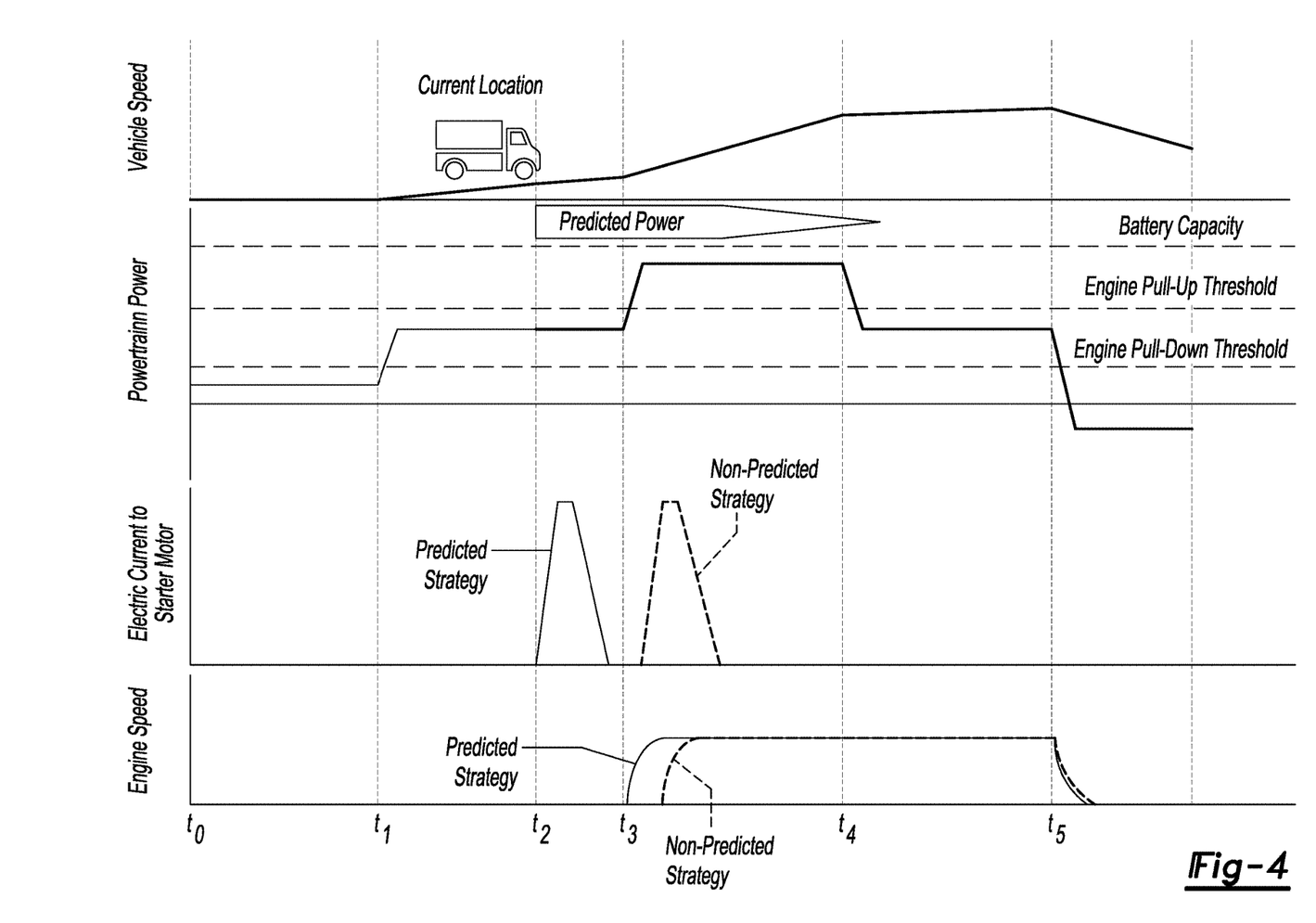
FIG. 4 is a series of graphs illustrating various vehicle parameters during an engine start that is initiated by a starter motor.

Referring to FIG. 4, a series of graphs of various vehicle parameters during an engine start that is initiated by a starter motor (e.g., ISG 64) is illustrated. The power graph illustrated in FIG. 3 corresponds to the powertrain power output profile required to propel the vehicle over the predicted or predetermined route determined at block 108 in method 100. At time $t_0$ the vehicle 10 is stopped and the powertrain 12 is producing minimal power. At time $t_1$, the vehicle 10 begins to slowly accelerate. The powertrain power output profile remains below the engine start or pull-up threshold between times $t_1$ and $t_2$. Therefore, between times $t_1$ and $t_2$, the powertrain 12 remains in the EV mode (i.e., the M/G 18 continues to propel the vehicle 10 while the engine 14 remains shutdown).

At time $t_2$, however, based on the predicted power outputs of the powertrain 12 according to the powertrain power output profile, the powertrain strategy determines that the engine 14 is expected to start in a short period of time (e.g., the predetermined period of time) in response to an upcoming increase in the powertrain power output profile to greater than the engine start or pull-up threshold. The powertrain strategy initiates the engine start at time $t_2$ by increasing an electrical current being deliver to the starter motor between times $t_2$ and $t_3$, such that the starter motor begins cranking the engine after time $t_2$ but before time $t_3$. At time $t_3$, the powertrain power output profile is increased to increase vehicle acceleration and the engine start is requested at the predetermined time period before time $t_3$ (i.e., at time $t_2$). In the case of a non-predicted strategy that does not predict the powertrain power requirements according the powertrain power output profile, there is an added delay in increasing the electrical current being delivered to the starter motor and bringing the engine 14 up to the desired speed relative to the predicted strategy that is based on the powertrain power output profile. Such a delay is illustrated in FIG. 4 by the timing differences between the non-predicted strategy and the predicted strategy according to the powertrain power output profile. At time $t_4$, the driver demand is decreased but the power demand of the powertrain power output profile remains high enough to keep the engine 14 on. At time $t_5$, the vehicle 10 begins to slow down and the power demand decreases to less than an engine pull-down or shutdown threshold, where the engine 14 is shut down.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
 a powertrain including an engine and an electric machine;
 an engine disconnect clutch configured to connect and disconnect the engine to and from the powertrain, respectively;
 a drive horizon system configured to generate a powertrain power output profile required to propel the vehicle over a predetermined route based on navigation data, the navigation data including a road grade of the predetermined route, a speed limit of the predetermined route, a road curvature of the predetermined route, traffic conditions of the predetermined route, or weather conditions of the predetermined route; and
 a controller programed to,
  in response to the electric machine operating to propel the vehicle over the predetermined route while the engine is shutdown and an upcoming increase in the powertrain power output profile to a value that is greater than a threshold, initiate an engine start at a predetermined time period before the upcoming increase in the powertrain power output profile, and
  in response to the electric machine operating to propel the vehicle over the predetermined route while the engine is shutdown and an upcoming increase in the powertrain power output profile to a value that is less than the threshold, maintain operating the electric machine to propel the vehicle over the predetermined route with the engine being shutdown.

2. The vehicle of claim 1 further comprising a starter motor configured to turn a crankshaft of the engine to start the engine.

3. The vehicle of claim 2, wherein the controller is further programmed to operate the starter motor to initiate the engine start at the predetermined time period before the upcoming increase in the powertrain power output profile to the value that is greater than the threshold.

4. The vehicle of claim 1, wherein the controller is further programmed to increase a pressure on the disconnect clutch to initiate the engine start at the predetermined period of time before the upcoming increase in the powertrain power output profile to the value that is greater than the threshold.

5. A vehicle comprising:
 a powertrain having an engine and an electric machine;
 an engine disconnect clutch configured to connect and disconnect the engine to and from the powertrain, respectively; and
 a controller programmed to,
  generate powertrain power output values to propel the vehicle at specified locations along a predetermined route based on navigation data,
  in response to the electric machine operating to propel the vehicle over the predetermined route while the engine is shutdown and an upcoming increase in the values that is greater than a threshold, initiate an engine start at a predetermined time period before the upcoming increase in the values, and
  increase a pressure on the disconnect clutch to initiate the engine start at the predetermined period of time before the upcoming increase in the values that is greater than the threshold.

6. The vehicle of claim 5, wherein the navigation data includes static data.

7. The vehicle of claim 6, wherein the static data includes a road grade of the predetermined route.

8. The vehicle of claim 6, wherein the static data includes a speed limit of the predetermined route.

9. The vehicle of claim 6, wherein the static data includes a road curvature of the predetermined route.

10. The vehicle of claim 5, wherein the navigation data includes dynamic data.

11. The vehicle of claim 10, wherein the dynamic data includes traffic conditions of the predetermined route.

12. The vehicle of claim 11, wherein traffic conditions of the predetermined route include a traffic density of the predetermine route.

13. The vehicle of claim 10, wherein the dynamic data includes weather conditions of the predetermined route.

14. The vehicle of claim 5 further comprising a starter motor configured to turn a crankshaft of the engine to start the engine, and wherein the controller is further programmed to operate the starter motor to initiate the engine start at the predetermined time period before the upcoming increase in the values that is greater than the threshold.

15. A vehicle comprising:
an engine and an electric machine;
an engine disconnect clutch configured to connect and disconnect the engine to and from a power path to a drive wheel, respectively; and
a controller programed to,
generate a power output profile required to propel the vehicle over a predetermined route based on navigation data,
in response to the electric machine operating to propel the vehicle over the predetermined route while the engine is shutdown and an upcoming increase in the power output profile to a value that is greater than a threshold, initiate an engine start at a predetermined time period before the upcoming increase in the power output profile,
in response to the electric machine operating to propel the vehicle over the predetermined route while the engine is shutdown and an upcoming increase in the power output profile to a value that is less than the threshold, maintain operating the electric machine to propel the vehicle over the predetermined route with the engine being shutdown, and
increase a pressure on the disconnect clutch to initiate the engine start at the predetermined period of time before the upcoming increase in the power output profile to the value that is greater than the threshold.

16. The vehicle of claim 15, wherein the navigation data includes a road grade of the predetermined route, a speed limit of the predetermined route, a road curvature of the predetermined route, and a traffic density of the predetermine route.

17. The vehicle of claim 15 further comprising a starter motor configured to start the engine, and wherein the controller is further programmed to operate the starter motor to initiate the engine start at the predetermined time period before the upcoming increase in the power output profile to the value that is greater than the threshold.

* * * * *